April 30, 1968   E. R. SEWELIN   3,380,773
MOUNTING MEANS FOR CABS OF CAB-OVER-ENGINE TYPE MOTOR VEHICLES
Filed March 28, 1966   5 Sheets-Sheet 1

INVENTOR
ERNEST R. SEWELIN
ATT'Y

April 30, 1968 E. R. SEWELIN 3,380,773
MOUNTING MEANS FOR CABS OF CAB-OVER-ENGINE TYPE MOTOR VEHICLES
Filed March 28, 1966 5 Sheets-Sheet 2

INVENTOR
ERNEST R. SEWELIN
Frederick J. Traubel
ATT'Y

April 30, 1968     E. R. SEWELIN     3,380,773
MOUNTING MEANS FOR CABS OF CAB-OVER-ENGINE TYPE MOTOR VEHICLES
Filed March 28, 1966     5 Sheets-Sheet 3

INVENTOR
ERNEST R. SEWELIN
ATT'Y

FIG. 5.
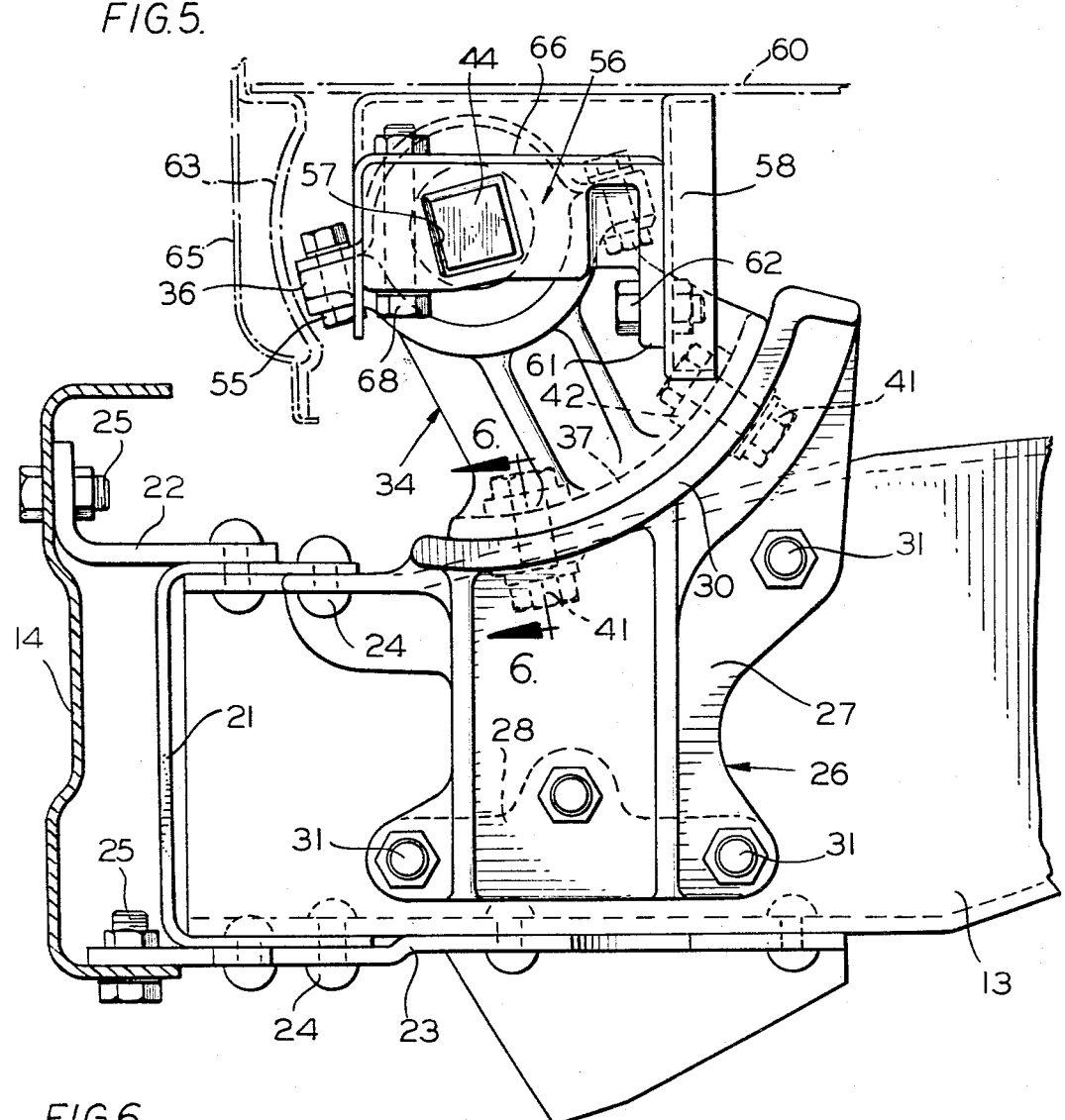
FIG. 6.
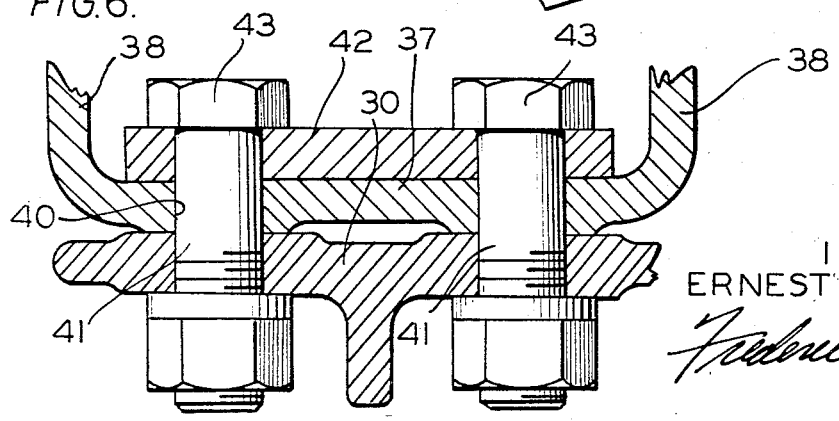
INVENTOR
ERNEST R. SEWELIN
ATT'Y

United States Patent Office 3,380,773
Patented Apr. 30, 1968

3,380,773
MOUNTING MEANS FOR CABS OF CAB-OVER-ENGINE TYPE MOTOR VEHICLES
Ernest R. Sewelin, Waterloo, Ind., assignor to International Harvester Company, Chicago, Ill., a corporation of Delaware
Filed Mar. 28, 1966, Ser. No. 537,750
9 Claims. (Cl. 296—28)

ABSTRACT OF THE DISCLOSURE

A mounting structure for connecting the forward end of an operator's compartment or motor truck cab of the forwardly tiltable type to a cab-over-engine motor truck chassis frame which mounting structure involves the utilization of elastomeric torsion spring means which not only function as counterbalancing means for assisting the tilting of the vehicle cab to its fully opened or forwardly tilted position, but also serve as a part of a resilient cab mounting system when the cab is in its normal lowered position to thereby mitigate the transmission of shocks, vibrations and noises from the vehicle chassis frame to the operator's compartment or cab.

---

This invention relates to mounting means for cabs of cab-over-engine type motor vehicles and, more particularly, to a new and novel torsilastic means for mounting a cab of the forwardly tiltable type on a chassis frame which torsilastic mounting means functions to counterbalance the weight of the vehicle cab to thereby facilitate forward tilting of the same.

The primary objective of the present invention is in the provision of an improved mounting structure for a motor truck cab of the type known as a cab-over-engine motor truck. To facilitate servicing, maintenance and repair of the engines of such motor vehicles, the entire vehicle cab is usually tiltable forwardly to a raised, engine-uncovered position from a normally lowered, engine-enclosing position. The improved mounting structure of the present invention contemplates the incorporation of elastomeric torsion spring means or torsilastic spring means in the pivot or trunnion connections between the tiltable vehicle cab and the chassis frame which spring means functions to counterbalance the weight of the vehicle cab and facilitates raising of the vehicle cab from its normally lowered position to its raised, forwardly tilted position.

A further object of the present invention is to provide a vehicle cab mounting structure for a tilting vehicle cab which functions to mitigate the transmission of forces, shocks and vibrations from the chassis frame to the operator's compartment when in its normally lowered, engine-enclosing position and which also functions to assist the operator in raising the vehicle cab to its fully opened position in order to gain access to the engine and engine appurtenances normally enclosed by the vehicle cab.

A more specific object of the invention is to provide a pivot or trunnion structure for pivotally connecting one end of a motor vehicle cab to the chassis frame for pivotal movement about a generally transversely extending, horizontal axis with respect to the chassis frame which pivot or trunnion structure includes a pair of torsilastic spring means, each of which involves the inter-position between the vehicle chassis frame and the operator's compartment of an elastomeric sleeve-like element.

Still another object of the present invention is to provide torsion means of the elastomeric type which not only functions as counterbalancing means for assisting the tilting of the vehicle cab to its fully opened position but also functions as a part of a resilient cab mounting system for mitigating the transmission of shocks, vibrations and noises from the vehicle chassis frame to the operator's compartment or cab.

The foregoing and other important objects and desirable features inherent in and encompassed by the invention, together with many of the purposes and uses thereof will become readily apparent from a reading of the ensuing description in conjunction with the annexed drawings, in which:

FIGURE 5 is an enlarged vertical sectional view taken substantially along line 5—5 of FIGURE 3;

FIGURE 6 is an enlarged detail sectional view taken substantially along line 6—6 of FIGURE 5;

Figure 1:
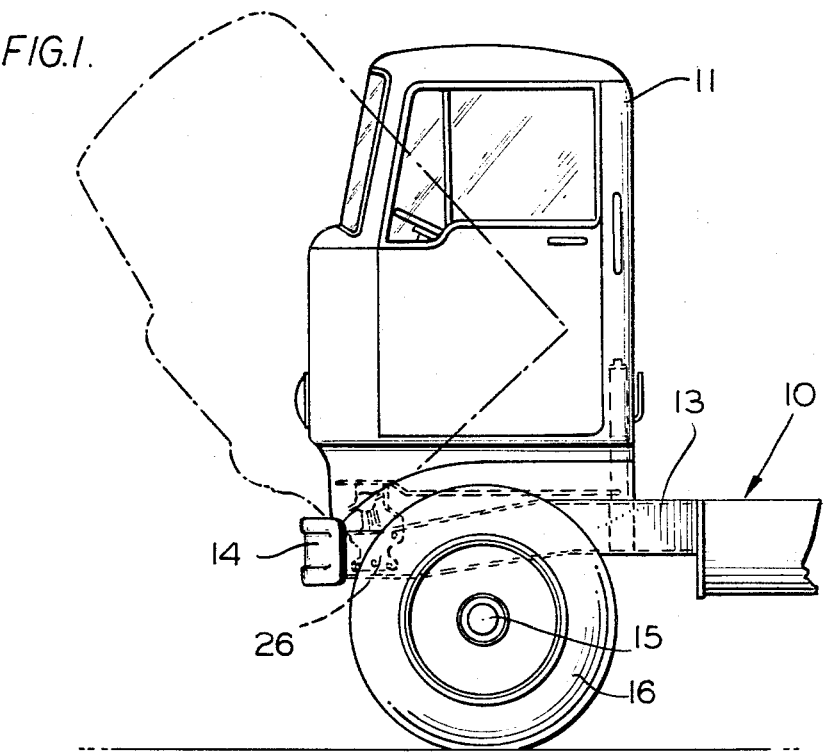
FIGURE 1 is a fragmentary side elevational view illustrating the tilting action of the vehicle cab when pivotally mounted on the chassis frame by the improved mounting structure of the invention.
Figure 2:
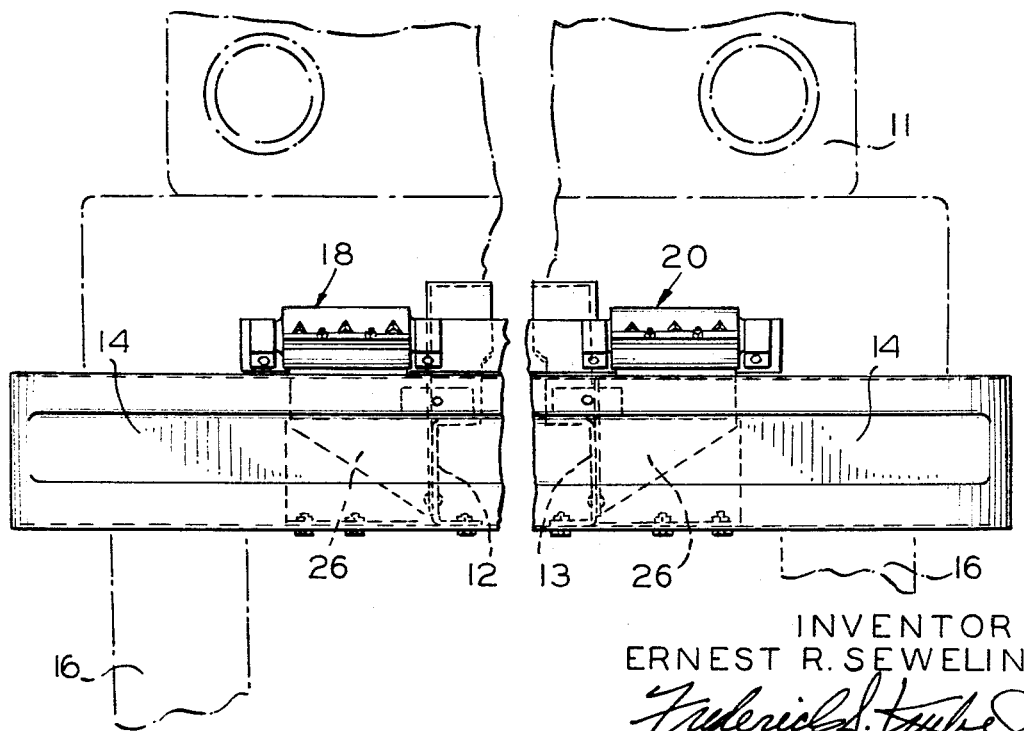
FIGURE 2 is a front elevational view of the pivotal mounting structure of the tilting vehicle cab of FIGURE 1 and showing the manner of attaching the mounting structure to the vehicle cab and to the chassis frame.

Referring to the drawings in detail, wherein like reference characters represent like elements throughout the various views, the invention is illustrated in FIGURE 1 as applied to a well-known type of motor truck 10 which is characterized by having the vehicle cab or operator's compartment 11 thereof mounted on the chassis frame in such a manner that it normally overlies and encloses the engine (not shown) and engine appurtenances but which is swingable to a raised, forwardly tilted position in order to expose the engine and engine appurtenances for servicing, maintenance and repair. The chassis frame of the motor truck 10 includes a pair of longitudinally extending, transversely spaced, generally channel-shaped side sill members 12 and 13 which are partially shown in FIGURE 3. The motor vehicle 10 also includes a front bumper 14 which is fixedly secured to the forwardmost ends of the side sill members 12 and 13. The reference character 15 indicates the front axle of the motor vehicle 10 and reference character 16 indicates the front wheels. The operator's compartment or vehicle cab 11 is connected to the chassis frame of the vehicle 10 at the forwardmost end of the chassis frame directly to the rear of the bumper 14. In accordance with the invention the means for connecting the forwardmost end of the vehicle cab 11 to the chassis frame includes pivot or trunnion connection means which permits tilting of the vehicle cab 11 between the aforementioned normally lowered and forwardly tilted, raised positions. The pivotal or trunnion connection means, in turn, of which there are two, each includes an elastomeric torsion spring means which not only function to assist tilting of the cab forwardly from its normally lowered position, as illustrated in broken lines in FIGURE 1, but also serves as a means for isolating the vehicle cab 11 from the shocks and vibrations to which the chassis frame is subjected during normal operation of the motor vehicle 10. The torsilastic spring means serve as part of the vehicle cab mounting system for resiliently connecting the vehicle cab 11 to the chassis frame 10 for controlled relative movement therebetween when the vehicle cab 11 is in its normal lowered position so as to mitigate the transmission of the shocks and damaging forces to which the chassis frame is subjected to during operation of the motor vehicle 10 from being fully transmitted to the vehicle cab 10 to possibly distort and break the same.

Figure 3:
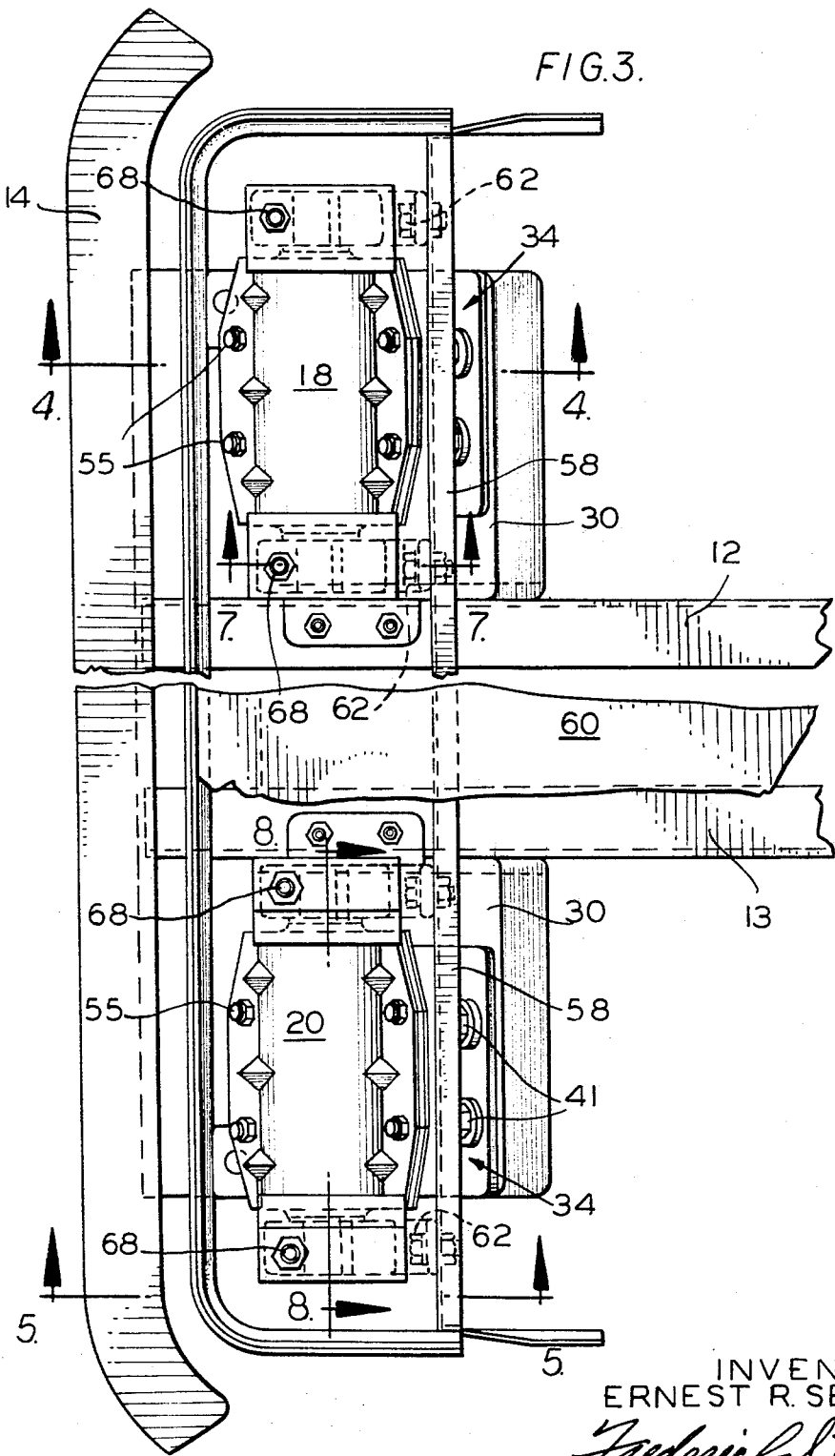
FIGURE 3 is an enlarged top view in plan of the pivotal mounting means of the invention.

As best shown in FIGURE 3, the forwardmost end of the vehicle cab 1 is connected to the chassis frame 10 adjacent the terminal ends of the side sill members 12 and 13 by means of a pair of transversely spaced and aligned trunnion units, designated generally by reference characters 18 and 20. In general, each trunnion unit 18, 20 comprises a stationary part which is rigidly fixed to the chassis frame of the vehicle 10 and a relatively movable part which is fixed to the vehicle cab 11. Torsilastic spring means is interposed between each stationary part and its associated movable part and operatively interconnects such parts. The trunnion units 18 and 20 permit the vehicle cab 11 to be swung between a normally lowered position, as shown in FIGURE 1, and a forwardly tilted, raised position illustrated with broken lines in FIGURE 1 about a generally transversely extending horizontal axis extending through the trunnion units 18 and 20.

The stationary part of the trunnion unit 18 is fixed to and the same is located to the outside of the longitudinal side sill member 12 whereas the stationary part of the other unit, namely 20, is fixed to and located to the outside of the side sill member 13. As shown in FIGURE 5, the side sill member 13 has a chassis frame front cross member 21, a top bracket plate 22, and a bottom bracket plate 23 fixed thereto by rivets 24. Similar plates are provided adjacent to and secured to the side sill member 12 and front cross member 21. The top and bottom plates, in turn, support the bumper 14 which is fixed to the plates by the bolts 25. The main supporting element for the stationary part of each trunnion unit 18, 20 comprises a support bracket 26 having a securing flange 27, a mounting pad 28 formed on the flange 27 and a flange (not shown) extending substantially at right angles to the flange 27 and an arcuate body portion 30, the said arcuate body portion 30 extending outwardly from the side sill member to which the bracket 26 is secured. The securing flange 27 and pad 28 are apertured for receiving fastening bolts 31 which fixedly unite the support bracket 26 to its respective side sill member 12 or 13. The aforementioned flange which is not shown is similarly apertured and abuts the top flange of a respective side sill member 12, 13 and is suitably bolted thereto.

Figure 4:
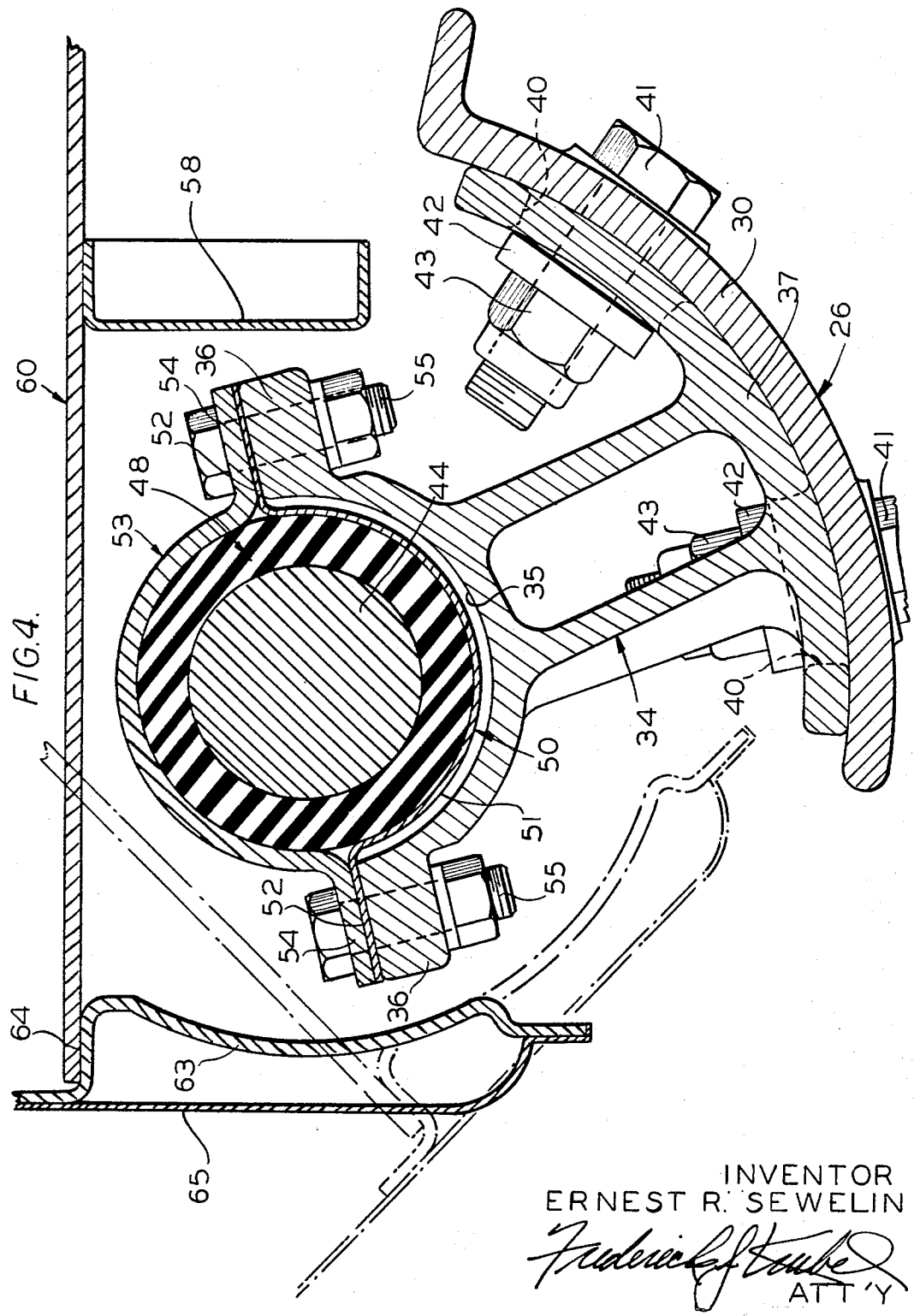
FIGURE 4 is an enlarged vertical sectional view taken substantially along line 4—4 of FIGURE 3.

A mounting bracket 34, FIGURES 4 and 5, is fixed in adjusted position on the arcuate body portion 30 of each supporting element. The top surface of each mounting bracket 34 provides a semi-circular formation 35 which is located between a pair of spaced pads 36. Each pair of the pads 36 and the semi-circular formation 35 associated therewith extending the length of a respective mounting bracket 34. It will be noted that each arcuate body portion 30 extends transversely outwardly from the side sill member 12, 13 with which it is associated. The bottom wall 37 of each mounting bracket 34 is arcuate in vertical section and the arcuate contour thereof is complementary to the arcuate body portion 30. The radii of curvature of the semi-circular formations 35 and the bottom walls 37 extend from a common axis which coincides with the pivotal axes of the cab 11. The bottom wall 37 is integral with longitudinally spaced side walls 38. FIGURE 6, and said bottom wall 37 is apertured or slotted at 40 to form longitudinally elongated openings which receive securing bolts 41. Thus, it is possible to adjust the position of each mounting bracket 34 with respect to and along the arcuate body portion 30 of the stationary supporting part associated therewith. As shown in FIGURE 6, a pair of spacer bars 42 may be employed to facilitate clamping of each of the bottom walls 37 to its respective arcuate body portion 30 and for transversely bridging the slots 40. The spacer bars 42 preferably located between lock nuts 43, which are threaded on the bolts 41, and the bottom wall 37 of the mounting bracket 34.

Figure 8:
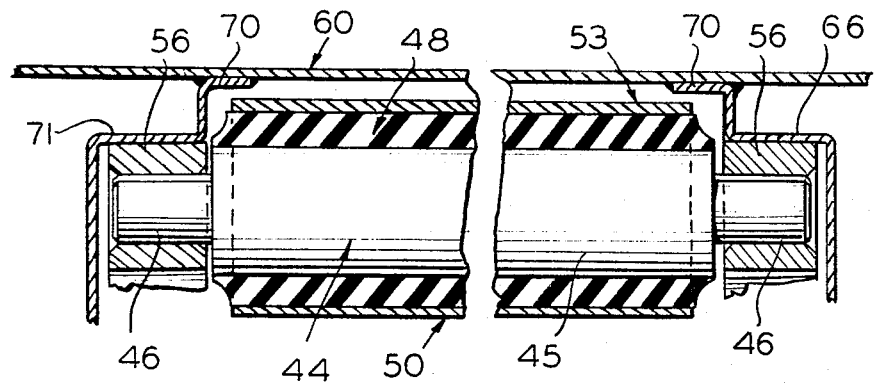
FIGURE 8 is a vertical sectional view taken through one of the pivot or trunnion connection means between the forward end of the vehicle cab and the chassis frame substantially along line 8—8 of FIGURE 3.

Numeral 44 indicates the torsion spring means in its entirety, the same having a substantially cylindrical body portion or pivot pin 45, as evident from FIGURE 8, and square end portions 46. The body portion or pivot pin 45 is encased in a sleeve or cylinder of rubber 48 or similar elastomeric material. The material employed should be of a high grade having superior qualities since considerable stress is applied thereto, as will be pointed out hereinafter, when the vehicle is in service. The body portion 45 is suitably bonded to the elastomer material 48 throughout its entire outermost surface and thus the body portion 45 and the sleeve 48 comprise a substantially integral unit. Substantially the entire lower semi-cylindrical half of the elastomer sleeve 48 is similarly bonded to a lower, outer shell 50 which is formed with a shaped portion 51 complementary to that of elastomeric sleeve 48, and said shell 50 is also formed with oppositely projecting side tabs 52 which are adapted to rest on the pads 36 of the mounting brackets 34. An upper, outer shell 53 of considerably heavier material than the lower shell 50 is provided which is capable of being positioned over and cover substantially the entire upper semi-cylindrical half of the sleeve 48. The outside shell 53 is provided with oppositely projecting pads 54 which are slightly spaced and in alignment with the side tabs 52 of the inside shell 50 associated therewith when the body portion 45 is detached from its respective mounting bracket 34. The clamping of the upper shell 53 to the mounting bracket 34 is accomplished by the bolts 55, this structural feature of the invention being characterized by the tabs 52 of the lower shell 50 being interposed between the pads 36 and 54 of the mounting bracket 34 and upper shell 53, respectively. Bolts 55 not only serve to rigidly secure the torsion spring means 44 to the mounting brackets 34, but also function to cause each pad 54 and its related side tab 52 to be forced tightly into abutting engagement with each other and, consequently, the elastomer material of the sleeves 48 are compressed slightly in a radial direction and are, thus, firmly, clamped between the shells 50 and 53. From the foregoing, it is to be understood that when the shells 50 and 52 are clamped together in the aforementioned manner the frictional force developed between each upper shell 53 and its associated sleeve 48 is sufficient to prevent any relative rotational movement therebetween. It will also be understood from the foregoing that each torsion spring means 44 is supported by a mounting bracket 34 with rubber or similar material interposed between the body portion 45 and the support bracket 26 associated therewith. As a result of the aforementioned clamping action of the upper and lower shells 53, 50 are caused to grip the elastomer material in such a manner as to assist the bonds between the sleeves 48, shells 50, and body portions 45 and to preclude relative slipping therebetween.

Figure 7:
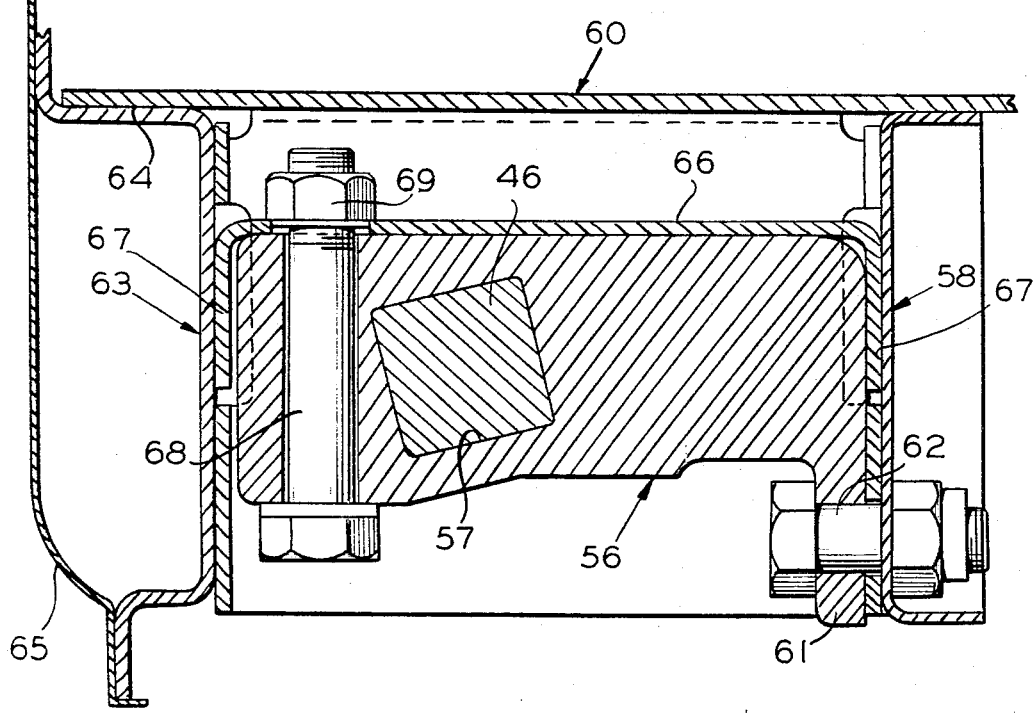
FIGURE 7 is an enlarged vertical sectional view taken substantially along line 7—7 of FIGURE 3.

The squared end portions 46 of each of the torsion spring means body portions 45 are anchored to the cab 11 by means of an end bracket 56, FIGURE 7. Each end bracket 56 is accordingly apertured at 57 in such a fashion so as to provide a square opening or socket for receiving a respective squared end portion 46 of a body portion 45. It is to be understood that the sockets are of a size with respect to the size of the end portions 46 that play or excessive movement between the parts is eliminated. Two end brackets 56 are provided for each torsion spring means and such end brackets 56 are rigidly secured to the underside of the vehicle cab 11 adjacent the forward end thereof. Each bracket 56 is located at a respective end of a body portion 45 so that each end thereof is fixedly or non-rotatably connected to the cab 11, whereas the lower and upper shells 50, 53 are fixedly connected to the vehicle chassis frame with the elastomer means 48 being, in effect, interposed between the cab 11 and the chassis frame. The anchoring of the end brackets 56 to the cab 11 is conveniently effected by making use of certain portions of the cab under body assembly or frame which underbody assembly is a part of the cab structure and such portions thereof to which the end brackets 56 are secured comprise a channel member 58 which extends transversely of the cab 11 and is welded or otherwise rigidly secured to the floor 60 of the cab 11. The channel member 58 depends from the cab floor 60 and, as shown in FIGURE 7, is secured to tab-like portions 67 of a support bracket 66 by any suitable means. A flange-like portion 61 of each end bracket 56 is, in turn, secured to the channel member 58 and the support bracket 66 by the securing bolt 62.

At the left, as viewed in FIGURE 7, or forwardmost end of each end bracket 66, the cab underbody structure is constructed to provide a front cross sill 63 which is secured at 64 by welding or the like to the cab floor 60. The sill 63 serves as a part of the cab framework and, as shown in FIGURE 7, the cowl outer panel 65 of the cab 11 is fastened thereto. The sill 63 also is attached rigidly to the brackets 66 and each bracket 66 extends over the top of the end bracket 56 associated therewith. A securing bolt 68 is provided for rigidly fastening each end bracket 56 to a respective bracket 66, the said bracket 66 being, in turn, fixedly secured to the sill 63 at the forward end or left-hand end thereof and to the channel member 58 at the rear end or right-hand end, as viewed in FIGURE 7. FIGURE 8 shows the bent uppermost terminal end portion 70 which is formed on each of the brackets 66. The uppermost end portions 70 are welded or otherwise secured to the floor 60 of the cab 11. Each bracket 66 further includes a stepped portion 71 vertically spaced below the portion 70 associated therewith. The uppermost surface of a respective end bracket 56 is positioned in abutting engagement with the underside of each portion 71 and a respective one of the securing bolts 68 extends through each end bracket 56 and each portion 71 in engagement therewith. The bolts 68 are employed to facilitate rigidly fastening the brackets 56 and 66 together. From the foregoing, it will be appreciated that both torsion spring means body portions 45 are non-rotatively secured to the underside of the cab 11 at the forward end thereof and the longitudinal axes of the body portion 45 are substantially in transverse, horizontal alignment.

The tilting cab mounting means as herein described can be readily assembled since it involves a relatively small number of parts. Each mounting bracket 34 and associated parts securely anchor one part of a respective torsion spring means 44 to the chassis frame and the relatively movable part of each torsion spring means, in turn, is fixed to the cab 11 by means of a pair of brackets 56 which non-rotatably receive the square ends 46 of the torsion spring means body portion 44. The elastomeric means not only serve to isolate the cab 11 and mitigate the transmissions of damaging forces and shocks thereto from the chassis frame but are also preferably designed so as to function as counterbalancing means to facilitate swinging of the vehicle cab 11 from its normally lowered, engine-enclosing position to its forwardly tilted, raised position. This is accomplished in the manner that will be pointed out presently. When the vehicle cab 11 is in its forwardly tilted position, the mounting brackets 34, which are relatively stationary during the cab tilting operation, are angularly oriented or adjusted with respect to the end brackets 56 secured to the movable vehicle cab 11 when the cab 11 is mounted on the chassis frame such that no torsional loading is imposed upon the cylindrical rubber sleeves 48. Under these circumstances, the rubber sleeves 48 are in their "neutral" condition since substantially no torsional shear stresses are created therein and, consequently, no forces are exerted by the rubber sleeves 48 tending to pivot the vehicle cab 11 with respect to the chassis frame. However, upon lowering the cab to its normal engine-enclosing position there is an attendant torsional windup of the rubber sleeves 48 creating forces which progressively increase in magnitude as the cab 11 approaches its normal, lowered position. The developed forces cause moments to be exerted on the body portions 45 and since such body portions 45 are non-rotatably secured to the cab 11, the moments tends to rotate the body portions 45 and the cab 11 are in a direction to urge the vehicle cab 11 to its raised, forwardly tilted position. From the foregoing, it will be appreciated that the torsional shear stresses created in the rubber sleeve 48 as the vehicle cab 11 is moved from its raised, forwardly tilted position to its normal, engine-enclosing position are at their maximum values when the vehicle cab 11 is in its normally upright engine-enclosing position. Although not shown, it is to be understood that suitable lock means are provided at the rearwardmost end of the vehicle cab underbody structure for releasably securing the vehicle cab 11 to the chassis frame. Thus, upon release of such cab lock means, the rubber sleeves 48 tend to torsionally unwind and, as a result, a counterbalancing effect is provided to reduce the effort required to raise the cab 11. By adjusting position of the bottom walls 37 of the mounting brackets 34 with respect to and along the arcuate body portions 30 of the stationary support brackets 26, the torsional preload can be varied and, hence, the magnitude of the counterbalancing force acting on the vehicle cab 11 when in its normally lowered position can be varied and preset. It will also be appreciated that the construction of the cab front mounting means or, more specifically, the mounting or trunnion units 18 and 20 is such that metal-to-metal contact between the vehicle cab 11 and the chassis frame is eliminated and, thereby, the transfer of vibrations and noise to the vehicle cab 11 is substantially reduced. The cab front mounting units 18 and 20 also permit the vehicle cab 11 to move relatively to a limited degree with respect to the chassis frame in a controlled manner by deformation of the rubber sleeves 48. The limited movement between the front end of the cab 11 and the chassis frame permitted by the cab front mounting means substantially reduces the imposition of damaging forces and strains on the sheet metal parts of the vehicle cab 11.

From the foregoing, it will be appreciated that the structure described above for interconnecting the vehicle cab 11 and the chassis frame performs multiple functions which functions were only obtainable in prior vehicles by the provision of a multitude of structures since it was generally necessary to have separate and distinct structure for obtaining each function. By operatively connecting the vehicle cab 11 in the aforesaid manner, vibrations are dampened out and the imposition of sudden shocks to the vehicle cab 11 is substantially reduced. Further, the above described structure for operatively connecting the forward end of the vehicle cab 11 to the chassis frame not only serves as means for resiliently supporting the forward end of the vehicle cab on the chassis frame and additionally as means for permitting the vehicle cab 11 to be swung between a normally lowered, engine-enclosing position and the raised, forwardly tilted, engine-exposed position about a substantially horizontal axis extending through hte pivot connecting means but also as a counterbalancing torque or torsion for assisting tilting movement of the vehicle cab to its rearwardly engine uncovered position.

The embodiment of the invention chosen for the purposes of illustration and description herein is that preferred for achieving the object of the invention and developing the utility thereof in the most desirable manner, due regard being had to existing factors of economy, simplicity of design and construction, manufacturing methods and the improvements sought to be effected. It will be appreciated, therefore, that the particular structural and functional aspects emphasized herein are not intended to exclude, but rather to suggest such other adaptations and

What is claimed is:

1. In a motor vehicle having a longitudinal chassis frame and an operator's compartment, the combination including said frame and operator's compartment comprising, mounting structure operatively interconnecting the forward end of said operator's compartment and said frame, said mounting structure permitting selective swinging movement of said operator's compartment with respect to said frame about a generally horizontal, transversely extending axis between a normally lowered position and a raised, forwardly tilted position, said mounting structure further permitting limited horizontal and vertical angular movements and vertical movement of said operator's compartment with respect to said frame when said operator's compartment is in its normally lowered position, said mounting structure including a pair of transversely spaced and aligned pivot connection means, each of said pivot connection means including a torsion spring means, each of said torsion spring means comprising a yieldable means, said yieldable means resiliently resisting said limited movements of said operator's compartment with respect to said frame, each of said yieldable means having one surface fixedly secured to said operator's compartment and another surface fixedly secured to said frame, said yieldable means of said torsion spring means being torsionally loaded when said operating compartment is in its normally lowered position, the magnitude of said torsional loading progressively decreasing as said operator's compartment is swung from its normally lowered position to its raised, forwardly tilted position whereby said torsion spring means counterbalance the weight of said operator's compartment during such swinging movement.

2. In a motor vehicle as set forth in claim 1, wherein each of said yieldable means includes a body of elastomeric material.

3. In a motor vehicle as set forth in claim 2, wherein each of said yieldable means is generally cylindrical in shape, and the longitudinal axis of each yieldable means coincides with said axis of swinging movement of said operator's compartment.

4. In a motor vehicle having a longitudinal chassis frame and an operator's compartment, the combination including said frame and operator's compartment comprising, mounting structure operatively interconnecting the forward end of said operator's compartment and said frame, said mounting structure permitting selective swinging movement of said operator's compartment with respect to said frame about a generally horizontal, transversely extending axis between a normally lowered position and a raised, forwardly tilted position, said mounting structure further permitting limited horizontal and vertical angular movements and vertical movement of said operator's compartment with respect to said frame when said operator's compartment is in its normally lowered position, said mounting structure including a pair of transversely spaced and aligned pivot connection means, each of said pivot connection means including a torsion spring means, each of said torsion spring means comprising a yieldable means, each of said yieldable means being generally cylindrical in shape to provide an outer cylindrical surface and an inner cylindrical surface, the longitudinal axes of said yieldable means coinciding with said axis of swinging movement of said operator's compartment, and each of said pivot connection means further including means fixedly securing said operator's compartment to one of said outer and inner surfaces, and means fixedly securing said frame to the other of said outer and inner surfaces, said torsion spring means being torsionally loaded when said operator's compartment is in its normally lowered position, the magnitude of said torsional loading progressively decreasing as said operator's compartment is swung from its normally lowered position to its raised, forwardly tilted position whereby said torsion spring means counterbalance the weight of said operator's compartment during such swinging movement.

5. In a motor vehicle set forth in claim 4, wherein said yieldable means are made from elastomeric material, and each of said means fixedly securing said operator's compartment to one of said outer and inner surfaces includes a pivot pin extending through and having an outer generally cylindrical surface thereof bonded to the inner cylindrical surface of a respective one of said yieldable means.

6. In a motor vehicle as set forth in claim 5, wherein each of said pivot pins has end portions projecting transversely outwardly from respective opposite ends of the yieldable means associated therewith, said pivot pin portions having non-round configurations, and each of said means fixedly securing said operator's compartment to said yieldable means includes a pair of transversely spaced brackets fixedly secured to the underside of said operator's compartment adjacent the forwardmost end thereof, each of said brackets being provided with a socket conforming to and for receiving a respective pivot pin end portion.

7. In a motor vehicle as set forth in claim 6, wherein each of said means fixedly securing said frame to the other of said outer and inner surfaces of a respective yieldable means includes a pair of generally semi-cylindrical shells arranged so as to substantially encircle said outer surface of a respective one of said yieldable means, and each of said means fixedly securing said frame to the other of said outer and inner surfaces of a respective yieldable means further including means for adjusting the magnitude of the torsional loading of said torsion spring means associated therewith when said operator's compartment is in its normally lowered position.

8. In a motor vehicle as set forth in claim 7, wherein said means for adjusting the magnitude of the torsional loading of said torsion spring means includes a support bracket fixed to said frame, said support bracket serving as a support for and being operatively connected to a respective pair of semi-cylindrical sleeves, said sleeves being rotatable about the axis of the pivot pin associated therewith with respect to said support bracket and pivot pin associated therewith, and clamping means for fixedly securing said sleeves to said support bracket associated therewith.

9. In a motor vehicle as set forth in claim 7, wherein said means for adjusting the magnitude of the torsional loading of said torsion spring means includes a support bracket fixed to said frame, said support bracket having a segmental, curved surface, the radius of curvature of said curved surface extending from the longitudinal axis of the pivot pin associated therewith, a second bracket fixedly secured to said pair of semi-cylindrical shells associated therewith, said second bracket having a curved surface conforming to engaging said curved surface of said support bracket, said curved surfaces being slidable relatively to each other to vary the magnitude of the torsional loading of the torsion spring means associated therewith when said operator's compartment is in its normally lowered position, and releasable clamping means for preventing relative sliding movement between said curved surfaces.

References Cited

UNITED STATES PATENTS

| | | | |
|---|---|---|---|
| 2,564,888 | 8/1951 | Foley et al. | 180—89 |
| 2,864,121 | 12/1958 | Imber et al. | 180—89 XR |
| 2,912,057 | 11/1959 | Wagner | 180—89 XR |
| 3,146,847 | 9/1964 | Rutman et al. | 180—89 |

BENJAMIN HERSH, *Primary Examiner.*

L. D. MORRIS, *Assistant Examiner.*